United States Patent Office 3,451,242
Patented June 24, 1969

3,451,242
APPARATUS FOR DEFORMING TUBING
Vincent Tobia, Chandlers Ford, Hampshire, England, assignor to Pirelli General Cable Works Limited
Filed Aug. 25, 1966, Ser. No. 575,121
Claims priority, application Great Britain, Oct. 27, 1965, 45,529/65
Int. Cl. B21b *13/20;* B21d *3/02*
U.S. Cl. 72—77                                13 Claims

ABSTRACT OF THE DISCLOSURE

Apparatus for deforming, e.g., corrugating, tubing having a deforming tool mounted in an annular rotatable member surrounding the tubing and rotatable about an axis which is eccentric with respect to the axis of the tubing, the latter being advanced axially. The eccentricity of the annular member is adjustable during rotation of the annular member by means of a cam inclined to the tubing axis.

---

Figure 1:
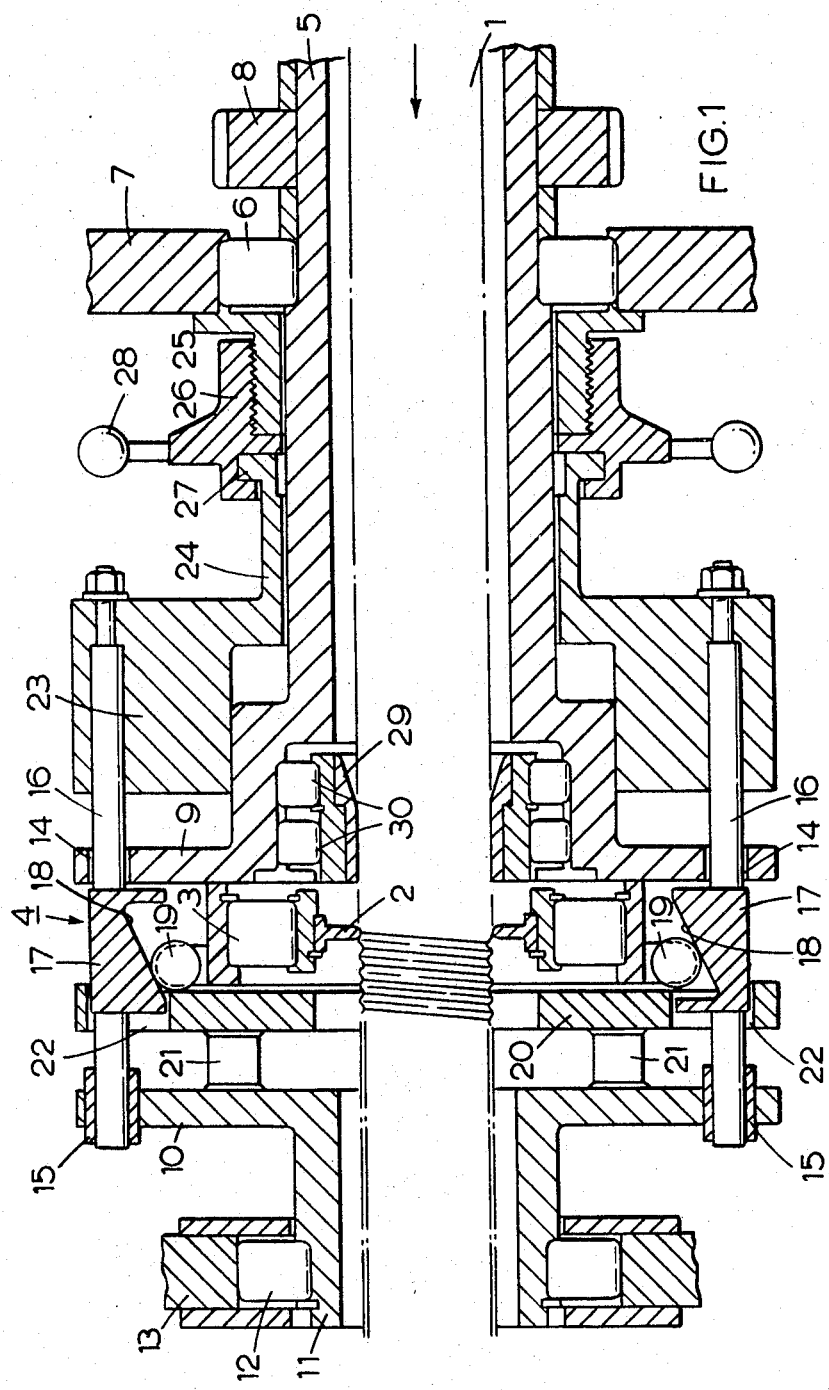

This invention relates to apparatus for deforming tubing and is especially, although not exclusively applicable to apparatus for corrugating tubing, for example tubing which constitutes an electric cable sheath.

In the complete specification of my earlier Patent No. 791,513 I describe and claim a method of corrugating an electric cable sheath, by bending it to form a helical trough in its wall, comprising the steps of subjecting the exterior of the sheath to the action of a tool having a ridge concave in the direction of its length, which extends in a plane transversely of the sheath at an angle to its axis other than a right angle, and whereof the distance of the nearest point on the ridge to the axis of the sheath is less than the external radius of the sheath as uncorrugated and the radius of the curvature of the ridge concavity at that point is equal to or greater than the external root radius of the sheath after corrugation, moving the sheath in the direction of its axis and simultaneously producing relative rotation between the tool and the sheath. The complete specification of Patent No. 791,513 also describes and claims apparatus for corrugating an electric cable sheath, by bending it to form a helical trough in its wall, comprising means for supporting the sheath and permitting its movement in the axial direction, a tool having a ridge bearing on the exterior of the sheath and concave in the direction of its length which extends in a plane transversely of the sheath at an angle to its axis other than a right angle, and whereof the distance of the nearest point on the ridge to the axis of the sheath is less than the external radius of the sheath as uncorrugated and the radius of curvature of the ridge concavity at that point is equal to or greater than the external root radius of the sheath after corrugation, and means for moving the sheath in the direction of its axis and for simultaneously producing relative rotation between the tool and the sheath.

In the complete specification of Patent No. 791,514 there is described and claimed a similar method and apparatus as applied to the manufacture of corrugated tubes other than those intended to act as sheaths. The present invention, however, is applicable to the manufacture of corrugated tubing in general irrespective of its intended end use as an electric cable sheath or otherwise.

In the machines described in Patents Nos. 791,513 and 791,514 the corrugating tool is preferably in the form of an annular member or ring with an inner periphery of ridge profile. The ring is mounted in a rotatable head eccentrically of the longitudinal axis of a tube in which corrugations are to be formed by said ring, the tube being arranged for displacement along said longitudinal axis through the ring. The ring is also tilted at a small angle to the plane perpendicular to this longitudinal axis.

The relative diameters of the ring and tube are such that, on rotation of the head and displacement of the tube along its longitudinal axis through the ring, the ridge profile of the ring bears on and presses in the external surface of the tube over an arc depending inter alia upon the degree of eccentricity of the ring centre from the tube axis. The ridge inner profile of the ring thus creates a corrugation in the external surface of the tube, the contour of the corrugation depending on the profile of the ridge and the pitch depending on the relative rates of rotation of the ring and longitudinal displacement of the tube, and the tilt angle.

It will be appreciated from the above that the degree of eccentricity will determine the maximum corrugation depth. In the machines described in Patents Nos. 791,513 and 791,514 means are provided for setting in advance this degree of eccentricity. For this purpose, there is provided a block which is slidable within the framework of the head, in a direction at right angles to the tube axis. The block carried in an inclined position (corresponding to the tilt angle desired) a ball bearing, to the inner race of which is attached the corrugating ring. A micrometer screw threaded through the framework is provided to adjust the relative position of the block within the framework, a clamping screw being provided also to lock the block with respect to the framework in the position to which it is moved by the micrometer screw.

While this arrangement is quite satisfactory, it will be appreciated that it is not suitable for enabling the degree of eccentricity, and hence the depth of corrugation to be altered during a corrugating operation, since during corrugating, the framework and the head as a whole will be rotating continuously so preventing any manual adjustment of the micrometer or clamping screws. By way of example, especially at the beginning and end of a corrugating operation it may be desired to vary the depth of corrugation, and especially in the case of tubes produced by extrusion, for example aluminium cable sheaths, any stoppage of the extrusion process to enable an adjustment to be made to vary said depth is undesirable.

It is accordingly a principal object of the present invention to provide an improved form of mounting, within the rotation head, for the corrugating ring whereby the degree of eccentricity can be varied as desired during rotation of the head.

According to the invention there is provided apparatus for deforming tubing comprising means for supporting tubing and permitting its movement in the axial direction, a deforming tool having a ridge disposed to bear on the external surface of said tubing and concave in the direction of its length, the distance of the nearest point of said ridge to the axis of said tubing being less than the external radius of undeformed tubing, means for rotating said deforming tool about said axis whilst said tubing is moved axially, to deform said tubing, and in which said deforming tool is coupled to one element of a cam and cam follower, the cam surface being inclined to the axis of said tubing, and means being provided for changing the relative position of said cam follower along said inclined cam surface to vary the distance of said ridge from the axis of said tubing.

In the machines described in the complete specification of Patents Nos. 791,513 and 791,514, the rotatable head is secured to a hollow shaft mounted in a suitable bearing in a stationary support, the shaft being coaxial with the longitudinal axis of movement of the tubing or sheath being corrugated.

The shaft and support are disposed before the corrugating ring (in the direction of travel of tubing or sheath) so that the tubing or sheathed cable passes through said shaft before being corrugated. Gear or other suitable means is provided to rotate the shaft and hence the corrugating ring and head as a whole.

In one preferred form of machine constructed in accordance with the present invention a similar arrangement is employed to drive the head. However, the end of the shaft nearer to the corrugating ring is flanged outwardly. A further short length of a shaft coaxial with the first mentioned shaft is also provided beyond the corrugating ring, i.e. on the side of said ring remote from the first mentioned shaft this further shaft being mounted in suitable bearings in a second stationary support. The end of this further shaft nearer to the corrugating ring is also flanged outwardly. The opposed end flanges of the shafts provide a framework between which the corrugating ring is mounted.

The flanges of the two shafts are provided with opposed pairs of apertures therethrough, at least two such pairs of apertures being provided. In each opposed pair of apertures there is slidably mounted a connecting rod, the connecting rods thus being substantially parallel to the axis of the shafts and being arranged externally of the corrugating ring. Each connecting rod is provided, in the part thereof between the two flanges, with a cam surface facing said corrugating ring. The cam surface is formed in a cut-out portion of the respective connecting rod, the profile of the cut-out portion being approximately sawtooth, with the notional base of the sawtooth parallel to the axis of the shafts, and the hypotenuse face of the sawtooth being inclined to said axis and providing the aforesaid cam surface. The corrugating ring is carried by the inner race of a bearing which is arranged to engage said cam surfaces at corresponding positions dependent upon the positions of said connecting rods. Thus movement of said piston members changes the positions of engagement of said bearing with the cam surfaces. Moreover, the precise location along the inclined cam surface of the bearing determines the distance of the centre of the corrugating ring from the axis of the shafts in a plane transverse to said axis, and hence determines the degree of eccentricity.

In one specific embodiment the pairs of apertures in the flanges may be located 180° apart from each other so that two diametrically opposite connecting rods with cam surfaces are provided. In this embodiment the opposite cam surfaces will be parallel to each other so as to enable the bearing of the corrugating ring to be translated transversely of the axis of the shafts as a whole. For this purpose the sawtooth cut out portions are provided in opposite senses in the two connecting rods.

Movement of the piston members causes the location of the bearing carrying the corrugating ring, on the cam surfaces, and hence the relative transverse position of the corrugating ring, to be varied. The piston members must move in unison and for this purpose may be secured, as by bolting, to the flanged end of a sleeve positioned around the first mentioned hollow shaft between the stationary support in which this shaft is mounted and the flange of said first mentioned shaft through which the connecting rods slidably pass. The sleeve is splined to the exterior surface of said first mentioned shaft so as to rotate therewith but be capable of longitudinal movement relative thereto. It will thus be appreciated that the relative position of the sleeve controls the eccentricity of the ring.

Adjustment of the relative position of the sleeve to the first mentioned shaft can be effected by a threaded ring engaging with a complementarily threaded second sleeve, surrounding the rotatable shaft but which sleeve is fixed to the stationary support or other convenient stationary part of the machine framework. The ring may be coupled to the end of the splined first mentioned sleeve remote from the flange of the first mentioned shaft, through an interpositioned thrust bearing, so that rotary movement is not transmitted between said ring and first mentioned sleeve but linear movement is so transmitted. The adjustment ring is thus precluded from rotating with the shafts in operation of the machine and can thus easily be controlled manually.

In order to alleviate the possibility of damage to the tube being corrugated due to the torque applied to said tube by the action of the corrugating ring, it is desirable to provide anti-torque rollers both in advance of and beyond the corrugating machine. These may be arranged in clusters around the tube, at suitable point or points along its path. The rolls may be idling rolls and mounted so their peripheries engage the tube being passed through the cluster but in tangential directions of contact each inclined at a slight angle to the direction of travel of the tube. The frictional forces at the points of contact thus have components at right angles to the tube surface, the rolls being positioned so that they provide a torque in the opposite sense to that set up by the corrugating ring.

Where the machine is being employed to corrugate the sheath of a sheathed cable emerging directly from an extrusion press the forward anti-torque roll cluster will be disposed off course between the press and the machine. However, it will be appreciated that a corrugating machine in accordance with the present invention can be employed in conjunction with other types of apparatus for forming a sheathed cable, for example, by folding metal strip around the cable core and welding together the abutting edges of the folded strip.

It has been mentioned above that the profile of the inner ridge of the corrugating ring will determine the contour of the corrugation formed in a tube. If the ridge width is so large in the direction of travel of the tube being corrugated as to exceed the corrugation pitch, it will be appreciated of course that no corrugation will be formed but that the corrugating ring will act as a swaging roll. The machine can thus be used to create a tube of reduced diameter, the reduction in diameter being equal to twice the depth of the notional corrugations; in particular, it may be used to reduce a sheath of oversize diameter onto a cable core.

Figure 2:
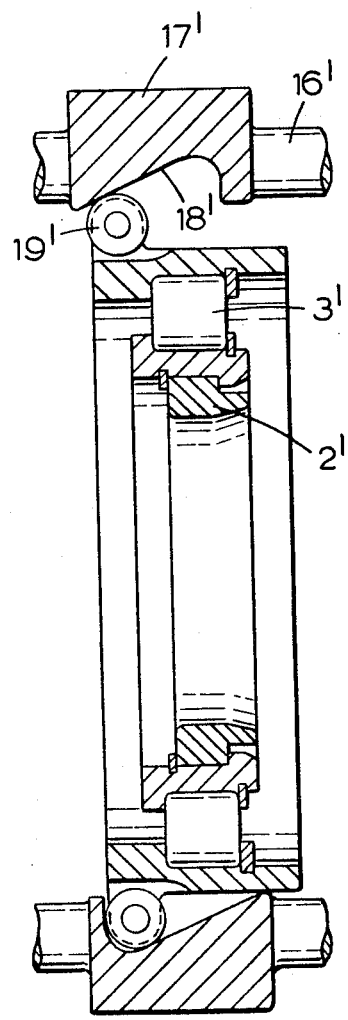

In order that the invention may be clearly understood and readily carried into effect it will now be more fully described with reference to the accompanying drawings in which:

FIGURE 1 is a longitudinal sectional view of a machine for deforming tubing in accordance with one embodiment of the invention, and FIGURE 2 shows, on an enlarged scale, a detail of a modified form of machine for deforming tubing, also in longitudinal section.

The machine shown in FIGURE 1 is adapted for corrugating tubing 1 which may, for example be the sheath of an electric cable. The machine incorporates a corrugating tool which is in the form of an annular member or ring 2 having an inner periphery of ridge profile. The particular configuration of the ridge profile may be as described in detail in the complete specification of Patent No. 791,513 with reference to FIGURES 1 and 2 of the drawings of that complete specification. The ring 2 is coupled to the inner race of a bearing 3 which is mounted in a rotatable head 4 so that said ring 2 surrounds a passageway through the machine, which passageway is arranged to accommodate the tubing 1. The bearing 3 is so mounted in the rotatable head 4 that the ring 2 is eccentric of the longitudinal axis of said passageway, which coincides with the axis of the tubing 1, and said ring may be tilted at a small angle to a plane perpendicular to said axis or may be parallel to such plane. A hollow shaft 5, forming part of the rotatable head 4, is mounted in a suitable bearing 6 in a stationary support 7, said shaft surrounding the aforesaid passageway so as to be coaxial with the tubing 1. The shaft 5 is disposed before the ring 2 in the direction of travel of the tubing 1, which is the direction of the arrow in the drawing, and said shaft 5 carries a gear wheel 8, or other suitable driving element, whereby said shaft 5 may be rotated about its axis. The end of the shaft 5 nearer the ring 2 is provided with an outwardly directed flange 9 which faces a similar flange 10 of second hollow shaft 11. The shaft 11 is mounted in a suitable bearing 12 in a stationary support 13 on the side of the ring 2 remote from the shaft 5, and the flange 10 thereof is provided at its end nearer said ring 2. As in the case of the shaft 5, the shaft 11 surrounds the aforesaid passageway and is co-axial with the tubing 1. The flanges 9 and 10 are provided with two pairs of opposite apertures, the apertures in the flange 9 being designated by reference 14 and the apertures in the flange 10 each containing a bearing sleeve 15. The two pairs of apertures are displaced from each other by 180°, i.e. are diametrically opposite to each other, and the flanges 9 and 10 are coupled together by two connecting rods 16. Each connecting rod 16 passes through an aperture 14 and the corresponding bearing sleeve 15 so as to be slidably mounted with respect to the flanges 9 and 10. Moreover the connecting rods 16 provide a coupling between the shafts 5 and 11 whereby said shafts 5 and 11 rotate together. In the region between the flanges 9 and 10, each connecting rod 16 carries a cam block 17, the surface of the block 17 which faces the ring 2 being provided with a cut-out portion which in this embodiment is approximately sawtooth in shape. The notional base of the sawtooth is parallel to the axis of the shafts 5 and 11, so that the hypotenuse face of said sawtooth is inclined to said axis and constitutes a cam surface 18. In this embodiment in which two oppositely disposed cam surfaces 18 are provided, said cam surfaces are arranged to be parallel to each other by providing the sawtooth cut-out portions in opposite senses in the two blocks 17. As can be seen in the drawing the flange 9 and the sleeves 15 serve as stops for the sliding movement of the connecting rods 16 by engagement with the respective ends of the blocks 17. The outer race of the bearing 3 carries a pair of diametrically oppositely disposed rollers 19 constituting cam followers, said rollers 19 being arranged to engage the respective cam surfaces 18. Thus it can be seen that the degree of eccentricity of the ring 2 is dependent upon the position of the rollers 19 along the cam surfaces 18, which position can be controlled by actuation of the connecting rods 16.

The head 4 also comprises a plate 20 mounted between the ring 2 and the flange 10 of shaft 11 and coupled to said flange, such as by bolts 21. The plate 20 has a central aperture coaxial with the axis of the shafts 5 and 11 and is also provided with two diametrically opposite apertures 22 for accommodating in sliding relationship the respective blocks 17 on the connecting rods 16.

In order to impart sliding movement to the connecting rods 16 the ends thereof which project from the side of the flange 9 remote from the flange 10 are mounted in a flange 23 of a sleeve 24. The sleeve 24 surrounds the shaft 5 and is splined thereto so as to be rotatable with said shaft 5 but longitudinaly displaceable with respect to said shaft 5, and said sleeve is positioned between the flange 9 and the stationary support 7. Thus longitudinal movement of the sleeve 24 with respect to the shaft 5 causes the connecting rods to slide with respect to the flanges 9 and 10 thereby changing the eccentricity of the ring 2 with respect to the axis of the tubing 1. In order to enable such longitudinal movement of the sleeve 24 to be effected readily even whilst the shaft 5, and hence said sleeve 24, is rotating, there is provided a further sleeve 25, surrounding the shaft 5 in axially spaced relationship with the sleeve 24, and fixed in position such as by being coupled to the stationary support 7. The sleeve 25 has an external screw threaded portion as shown which engages with an internally screw threaded ring or actuating member 26. As can be seen from the drawing the ring 26 abuts the end of the sleeve 24 in such a way that said sleeve 24 is rotatable relatively to said ring 26 but longitudinal movement of said ring 26 is imparted to said sleeve 24. For this purpose the ring 26 is formed with an annular recess in which a flange 27 at the end of the sleeve 24 resides, the flange 27 being rotatable within the recess. If desired the ring 26 and sleeve 24 may be coupled together via a suitable thrust bearing. The ring 26 is provided with a suitable actuating handle or handles 28 for rotating said ring 26 with respect to the fixed sleeve 25 whereby said ring 26 is longitudinally displaced and such longitudinal displacement is imparted to the sleeve 24 and thence to the piston members 16.

The tubing 1 is supported before corrugation in the passageway through the machine by means of a bush 29 which is mounted in the shaft 5 by means of suitable bearings 30. If desired a similar bush, mounted in the shaft 11 or plate 20 may be provided for supporting said tubing 1 after corrugation.

As previously described, if desired anti-torque rollers may be provided both in advance of and behind the corrugating machine. Such rollers are not shown in the drawing but may take the form hereinbefore described.

In operation of the machine shown in FIGURE 1 and described above, the shaft 5 is rotated employing the gear wheel 8, thereby rotating the head 4 including the ring 2. At the same time the tubing 1 is fed through the passageway in the machine along the axis of said passageway in the direction of the arrow. By way of example the tubing may be fed directly from an extrusion press in which the tubing is formed, or from apparatus for forming a sheathed cable, for example by folding metal strip around the cable core and welding together the abutting edges of the folded strip. Alternately the tubing 1 may be fed axially as a result of the corrugating action of the ring 2 as described in the complete specification of the aforesaid Patent No. 791,513, in which case the ring 2 must be tilted at an angle to a plane perpendicular to the axis of the tubing 1. The rotating ring 2 bears on the surface of the tubing 1 over an arc depending upon the relative sizes of the external diameter of the tubing 1 and the internal diameter of said ring 2 and the degree of eccentricity therebetween. As the ring 2 rotates the arcuate bearing surface travels around the tubing 1 in a helical path, thus forming a helical corrugation in said tubing 1. In order to vary the depth of corrugation imparted to the tubing 1, the degree of eccentricity of the ring 2 with respect to the tubing 1 is varied by rotating the ring 26 with respect to the sleeve 25. If the ring 26 is unscrewed from the sleeve 25 it moves the sleeve 24, and thus the connecting rods 16 and blocks 17 in the direction of feeding of the tubing 1. This causes the rollers 19 to ride up the cam surfaces 18 thereby increasing the aforesaid eccentricity and so the corrugation depth. If the ring 26 is screwed further onto the sleeve 25 the eccentricity and corrugation depth are reduced.

In a modified embodiment of the invention the machine may be similar to that shown in FIGURE 1 with the exception of the configuration of the ring 2. The ring and its mounting of such a modified machine are shown on an enlarged scale in FIGURE 2 and the various parts of the machine shown are designated with the same reference numerals as in FIGURE 1 with the appendix '. Thus the ring 2' is coupled to the inner race of bearing 3' the outer race of which is coupled to a pair of diametrically oppositely disposed rollers 19' which are arranged to engage cam surfaces 18' provided on cam blocks 17' carried by slidable connecting rods 16'. The operation of the connecting rods 16', cam surfaces 18' and rollers 19' being identical to that already described with reference to the corresponding components of FIGURE 1, will not be further described in the case of this embodiment. In the embodiment of FIGURE 2, the width of the ridge in the inner periphery of the ring 2' is made so large that instead of corrugating the tubing as said tubing passes longitudinally through said ring 2', the ring 2' acts as a swaging roll to reduce the overall diameter of said tubing. This embodiment may, for example, be employed to reduce the diameter of a sheath of an electric cable onto said cable core.

Although the invention has been particularly described with reference to the machine shown in FIGURE 1 of the accompanying drawings and to a modification of that machine according to FIGURE 2, various other modifications can be made without departing from the scope of the appendant claims. For example the rotating head may be arranged to carry more than one corrugating or swaging tool, either arranged to act successively on the tubing or simultaneously as desired. Moreover, if desired the cam surface may be provided on a member coupled to the outer race of the bearing 3, the cam follower being mounted on the connecting rods 16. Further the deforming tool need not necessarily be in the form of a ring but may be constituted by another arcuate member. Moreover any suitable number of cams and cam followers may be employed.

What I claim is:

1. Apparatus for deforming tubing comprising means for supporting tubing and permitting its movement in the axial direction, an annular member, a deforming tool mounted in said annular member, to bear on the external surface of tubing, within the apparatus, and means for rotating said annular member about said axis while said tubing is moved axially, to deform tubing in the apparatus, and means for varying the eccentricity of the axis of the annular member with respect to the axis of tubing supported in the apparatus during rotation of the annular member comprising, a cam means having a cam surface which is inclined to the axis of tubing in the apparatus, and cam follower means abutting against said cam surface, one of said cam means and cam follower means being operatively connected to the annular member; and means for changing the relative position of said cam follower means along said inclined cam surface whereby the eccentricity of the axis of the annular member is varied with respect to the axis of said tubing and thereby varies the distance of said deforming tool from the axis of the tubing.

2. Apparatus according to claim 1 in which the deforming tool has a ridge disposed to bear on the external surface of the tubing, said ridge being concave in the direction of its length, the distance of the nearest point of the said ridge to the axis of the tubing being less than the external radius of the undeformed tubing.

3. Apparatus according to claim 2 in which the cam means comprise two cams, containing diametrically opposed parallel inclined cam surfaces and the cam follower means comprises two cams each of which abuts against a cam surface and is connected to the annular member.

4. Apparatus according to claim 2, wherein the means for changing the relative position of cam and cam follower includes means for moving the cam surface parallel to the axis of tubing within the apparatus.

5. Apparatus according to claim 4, wherein the means for rotating the annular member includes a rotatable head connected to the annular member, and further comprising a connecting rod carrying said cam and means for slidably mounting said connecting rod for displacement in said rotatable head parallel to the axis of a tube within the apparatus.

6. Apparatus according to claim 5, wherein said means for slidably mounting the connecting rod includes a sleeve coupled to said connecting rod and splined to said rotating head so as to be rotatable therewith but displaceable axially with respect thereto.

7. Apparatus according to claim 6 and further comprising an actuating member in abutting relationship with said sleeve for imparting axial displacement to said sleeve, said sleeve being rotatable with respect to said actuating member.

8. Apparatus according to claim 7, in which said actuating member comprises a screw-threaded ring, and a complementarily screw-threaded fixed member in engagement with said ring, whereby rotation of said ring to screw or unscrew it with respect to said fixed member axially displaces said ring.

9. Apparatus according to claim 2, in which said annular member comprises the outer race of a bearing, the inner race of which is connected to said deforming tool.

10. Apparatus according to claim 2, in which said cam has a profile of sawtooth shape, the notional base of said sawtooth being parallel to said axis and the hypoteneuse face of said sawtooth constituting said cam surface.

11. Apparatus according to claim 2, in which said cam follower means comprises a roller.

12. Apparatus according to claim 2, in which the width of the ridge of said deforming tool is such as to form helical corrugations in said tubing.

13. Apparatus according to claim 2, in which the width of the ridge of said deforming tool is sufficiently large to deform said tubing by reducing the diameter thereof.

References Cited

UNITED STATES PATENTS

| 1,318,962 | 10/1919 | Brinkman | 72—75 |
| 2,639,757 | 5/1953 | Cheek | 72—123 |
| 3,269,005 | 8/1966 | Smith et al. | 29—477.3 |

FOREIGN PATENTS

| 201,252 | 8/1955 | Australia. |
| 449,486 | 7/1936 | Great Britain. |

RICHARD J. HERBST, *Primary Examiner.*

U.S. Cl. X.R.

72—123